(12) United States Patent
Okuno

(10) Patent No.: US 11,305,425 B2
(45) Date of Patent: Apr. 19, 2022

(54) ANGULAR TRANSMISSION ERROR IDENTIFICATION SYSTEM, ANGULAR TRANSMISSION ERROR IDENTIFICATION METHOD, AND ROBOT SYSTEM

(71) Applicant: KAWASAKI JUKOGYO KABUSHIKI KAISHA, Kobe (JP)

(72) Inventor: Junichi Okuno, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 191 days.

(21) Appl. No.: 16/619,890

(22) PCT Filed: Jun. 4, 2018

(86) PCT No.: PCT/JP2018/021387
§ 371 (c)(1),
(2) Date: Dec. 5, 2019

(87) PCT Pub. No.: WO2018/225689
PCT Pub. Date: Dec. 13, 2018

(65) Prior Publication Data
US 2021/0146536 A1 May 20, 2021

(30) Foreign Application Priority Data
Jun. 5, 2017 (JP) .............................. JP2017-111011

(51) Int. Cl.
*B25J 9/16* (2006.01)
*B25J 9/10* (2006.01)
(Continued)

(52) U.S. Cl.
CPC ........... *B25J 9/1653* (2013.01); *B25J 9/1025* (2013.01); *B25J 9/163* (2013.01); *B25J 9/1638* (2013.01);
(Continued)

(58) Field of Classification Search
CPC ........ B25J 9/1653; B25J 9/1025; B25J 9/163; B25J 9/1638; B25J 9/1674; B25J 13/085;
(Continued)

(56) References Cited

U.S. PATENT DOCUMENTS

2010/0244755 A1* 9/2010 Kinugasa ............... B60L 15/025
318/400.23
2014/0203752 A1* 7/2014 Yamamoto ............... G05B 5/00
318/620
(Continued)

FOREIGN PATENT DOCUMENTS

JP S63-153610 A 6/1988
JP 2006075931 A * 3/2006
(Continued)

*Primary Examiner* — Abby Y Lin
*Assistant Examiner* — Esvinder Singh
(74) *Attorney, Agent, or Firm* — Oliff PLC

(57) ABSTRACT

An angular transmission error identification system that identifies an angular transmission error of a speed reducer of a robot arm including a joint that is rotationally driven by a motor via the speed reducer, including an identification unit that calculates amplitude and phase parameters of an angular transmission error identification function, which is a periodic function that models an angular transmission error of the speed reducer and has the parameters, and identifies the error using the function, wherein the unit calculates an amplitude parameter corresponding to a gravitational torque current value which is a value acting on a joint when the error is identified using a first or second amplitude function according to a value of the gravitational torque current value, and calculates a phase parameter corresponding to the gravitational torque current value using a first or second phase function according to a value of the gravitational torque current value.

8 Claims, 8 Drawing Sheets

(51) Int. Cl.
   *B25J 13/08*   (2006.01)
   *B25J 17/00*   (2006.01)
(52) U.S. Cl.
   CPC ........... *B25J 9/1674* (2013.01); *B25J 13/085* (2013.01); *B25J 17/00* (2013.01)
(58) Field of Classification Search
   CPC ........ B25J 17/00; B25J 9/1641; B25J 9/1633; B25J 9/1055; G05B 2219/41114; G05B 2219/39194; G05B 2219/39195; G05B 2219/41112; G05B 2219/49197; G05B 2219/49292; G05B 2219/23038; G05B 2219/33253; G05B 2219/41208; G05B 2219/41213
   See application file for complete search history.

(56) References Cited

U.S. PATENT DOCUMENTS

2016/0070247 A1* 3/2016 Ohishi .................... H02P 23/12
                                                        700/275
2020/0324406 A1* 10/2020 Ayuzawa ................ B25J 9/101

FOREIGN PATENT DOCUMENTS

| JP | 2009-061519 A | 3/2009 |
| JP | 2011-212823 A | 10/2011 |

* cited by examiner

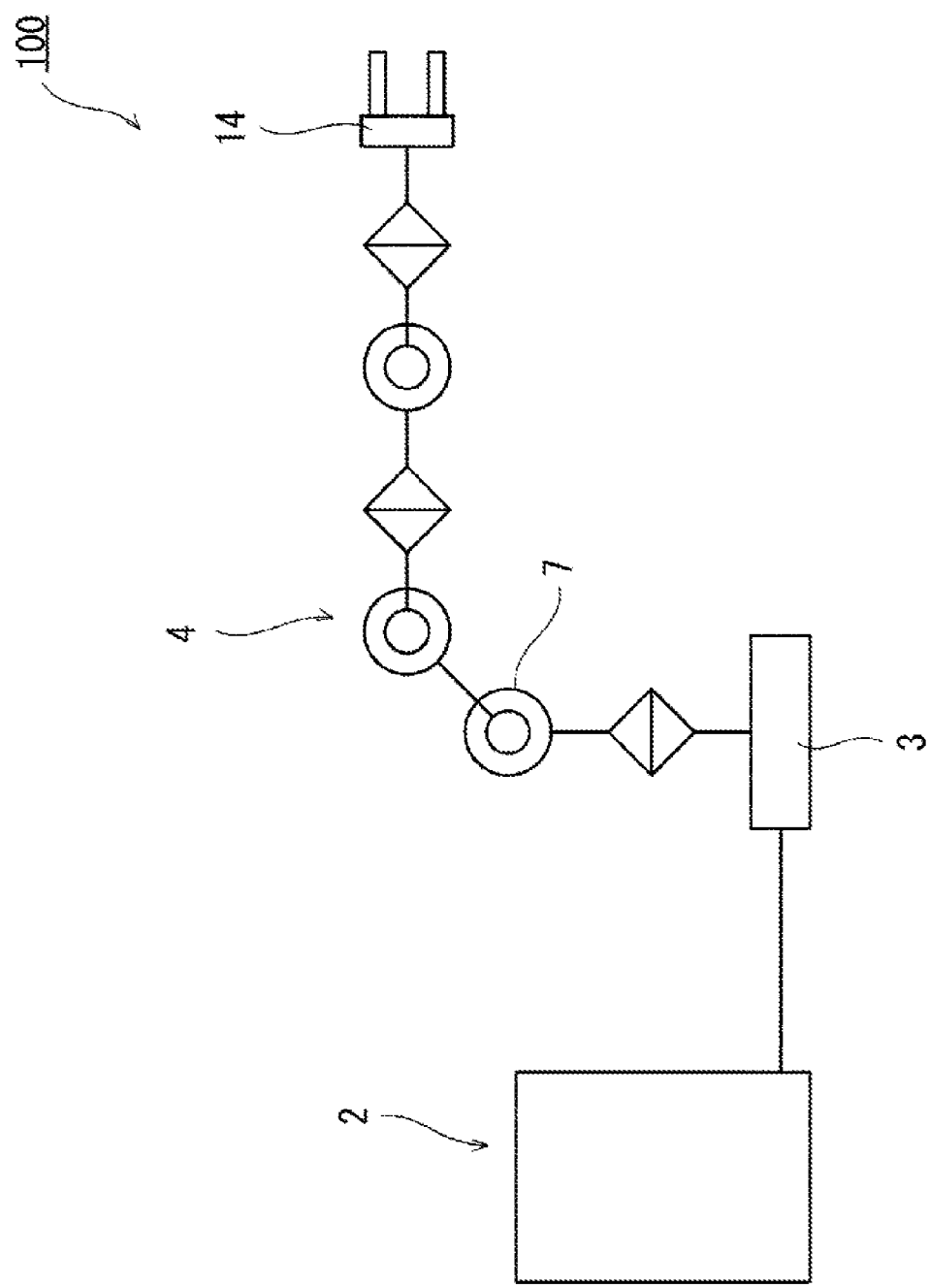
[Fig. 1]

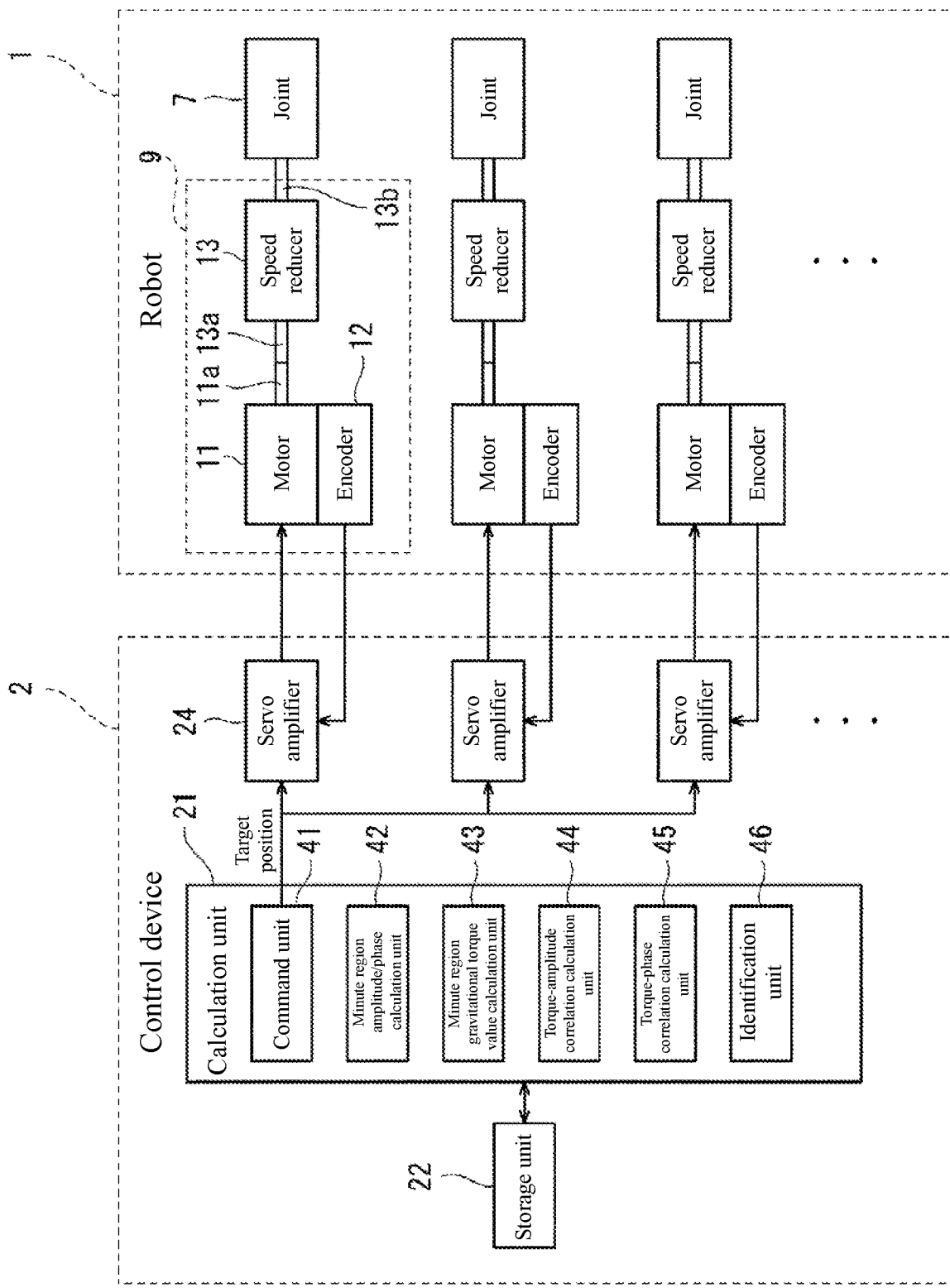
[Fig. 2]

[Fig. 3]
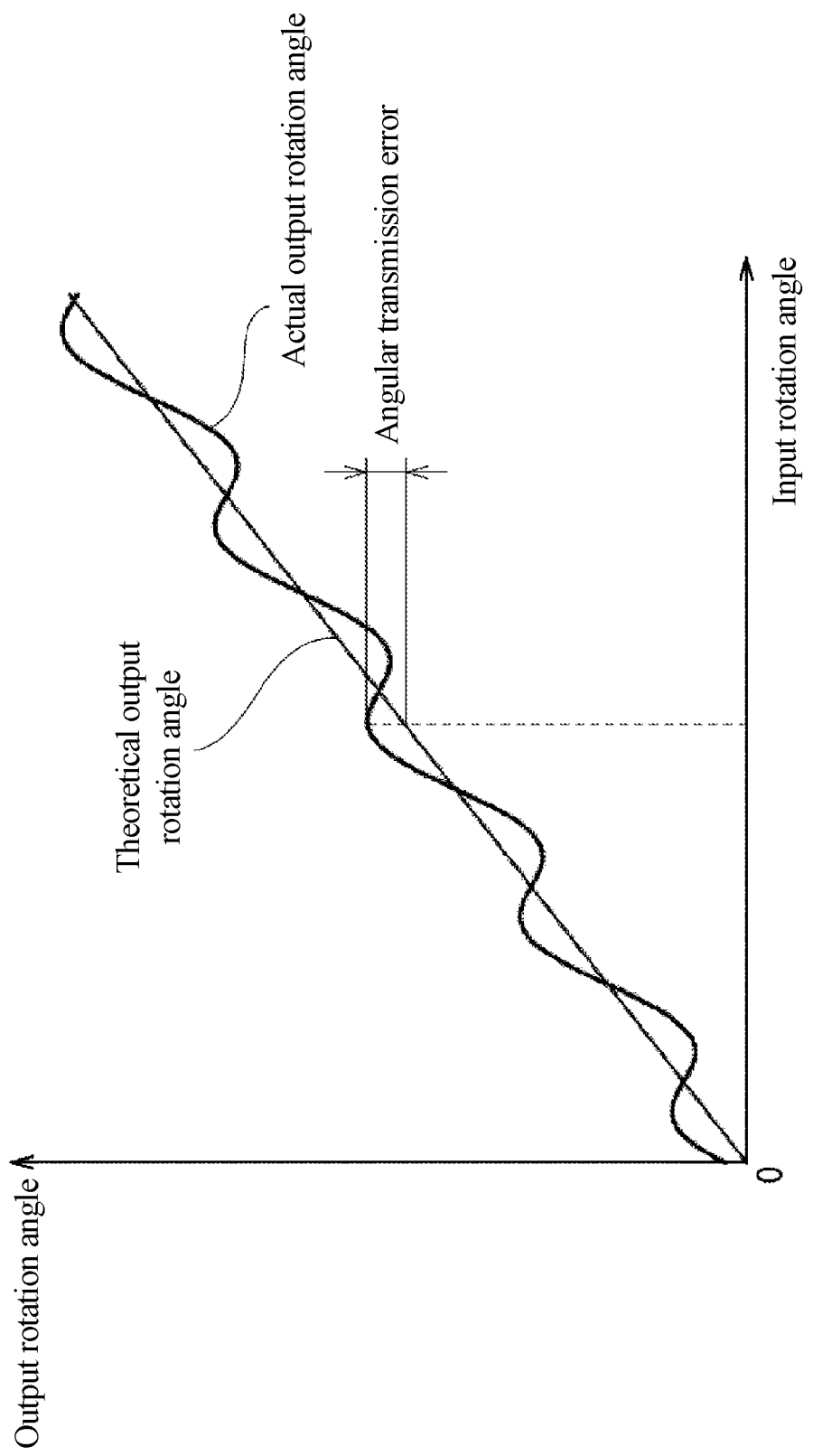

[Fig. 4]
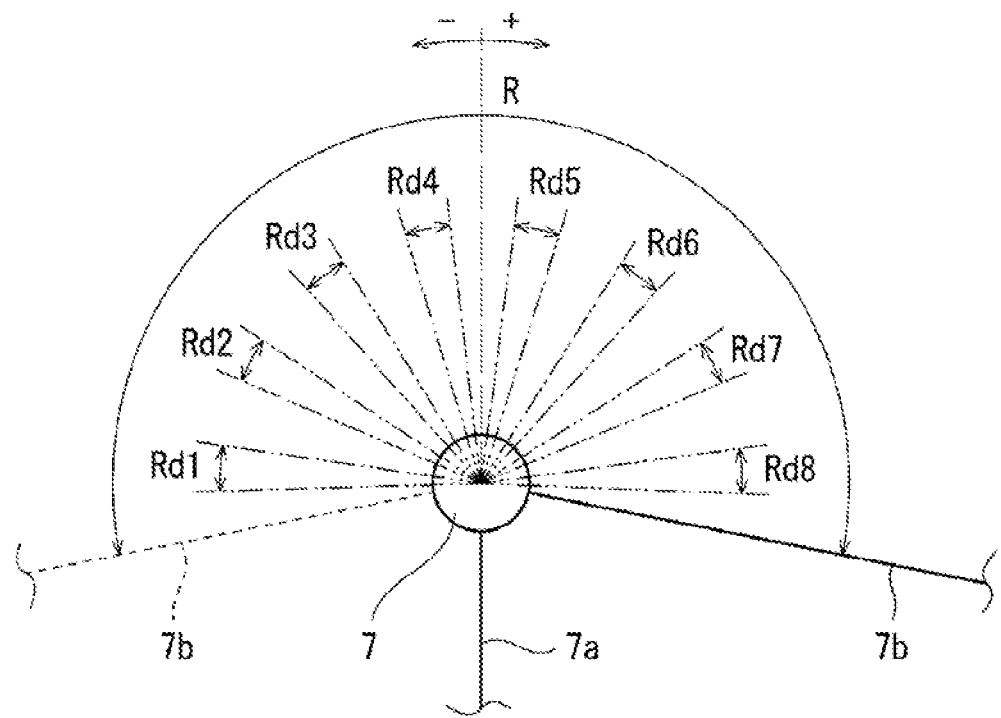
[Fig. 5]
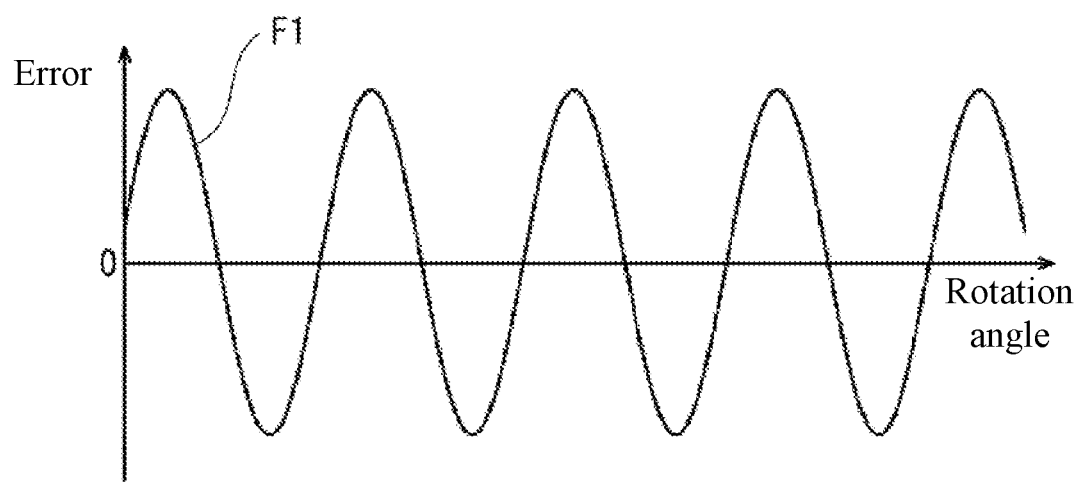

[Fig. 6A]
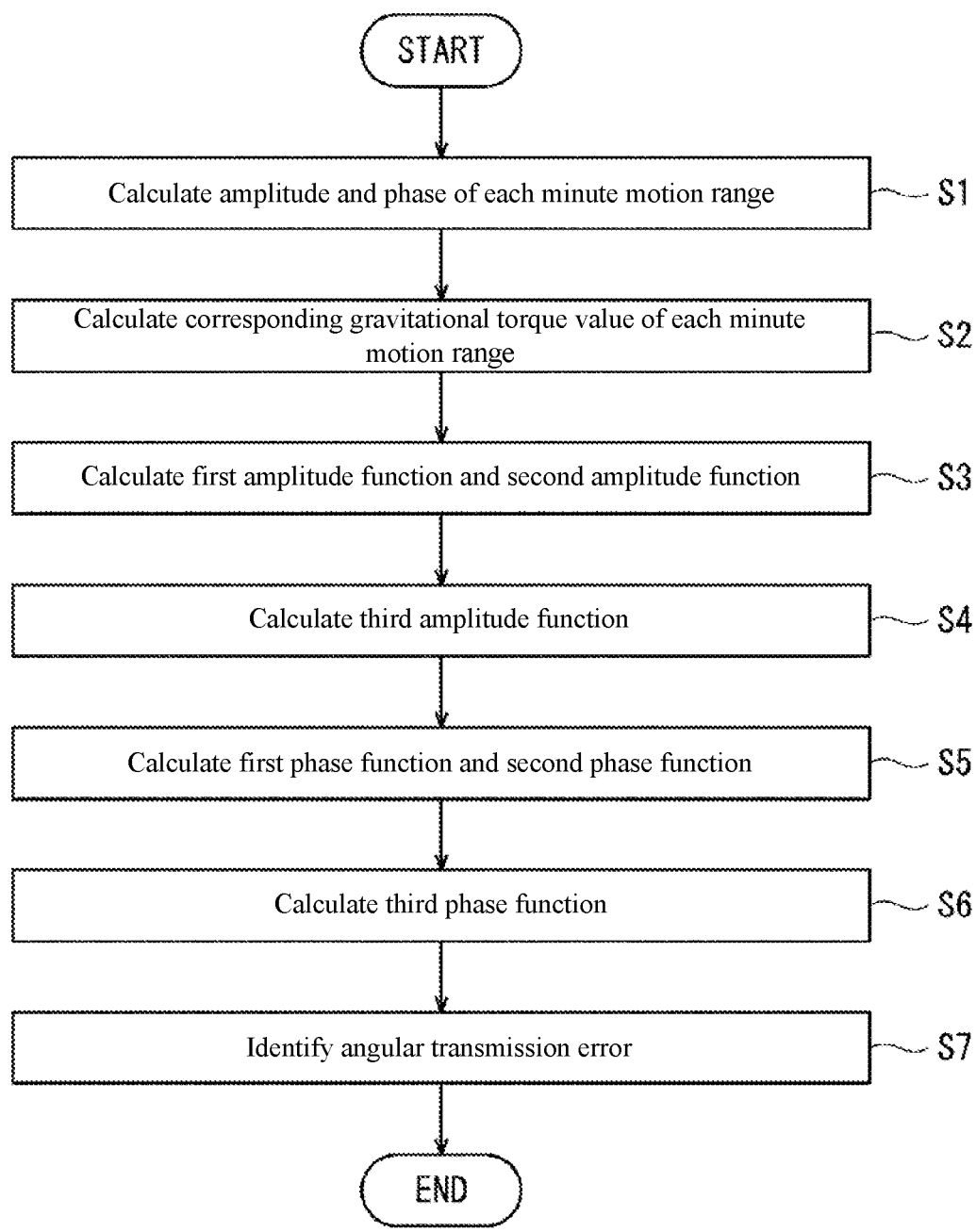

[Fig. 6B]
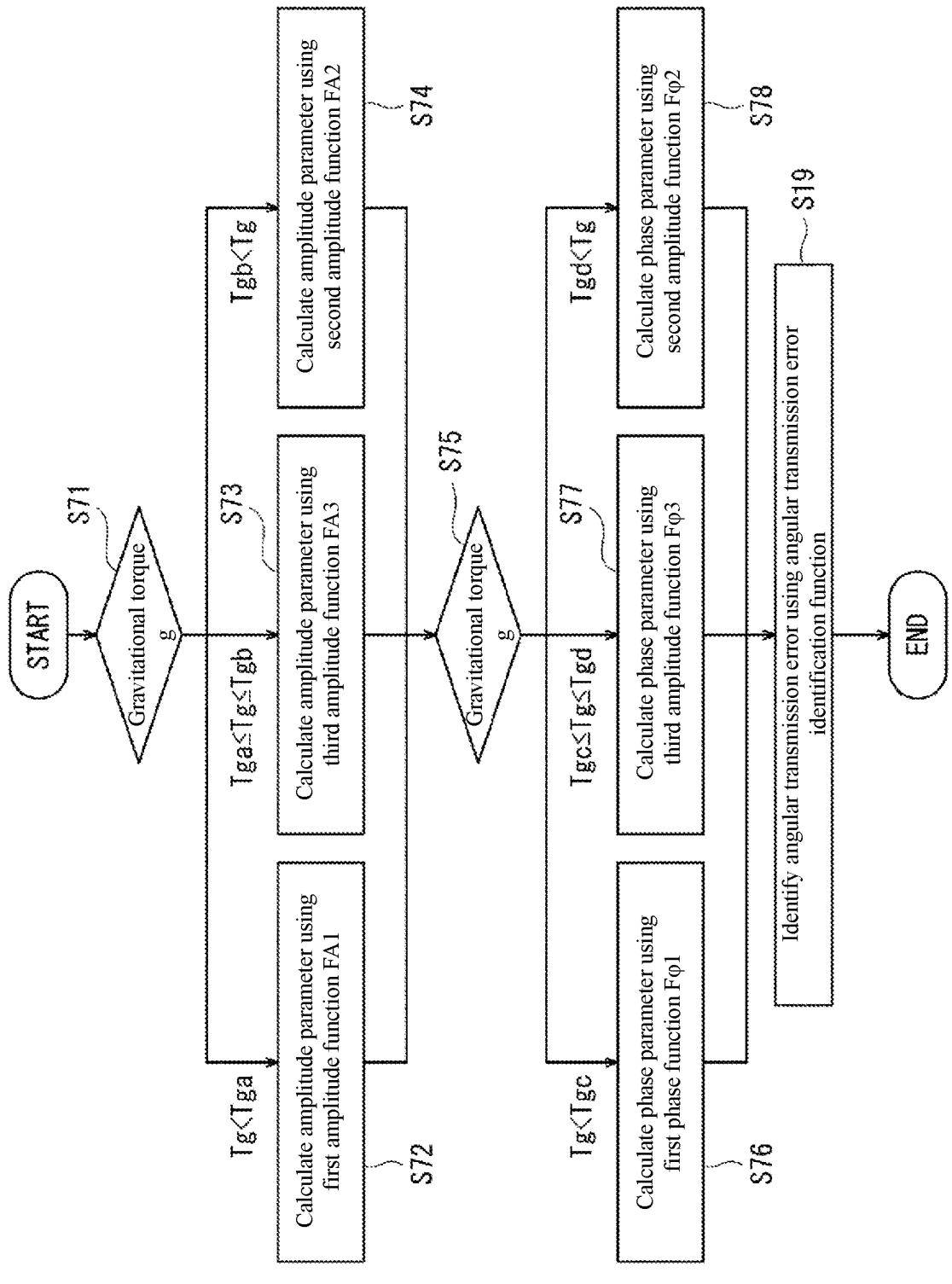

[Fig. 7]
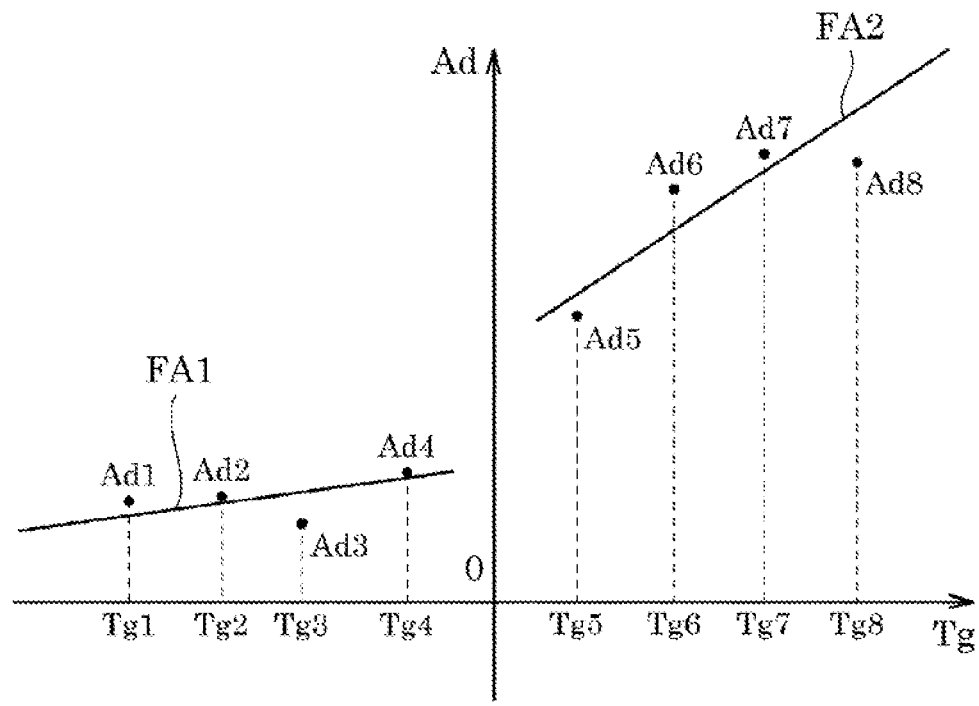
[Fig. 8]
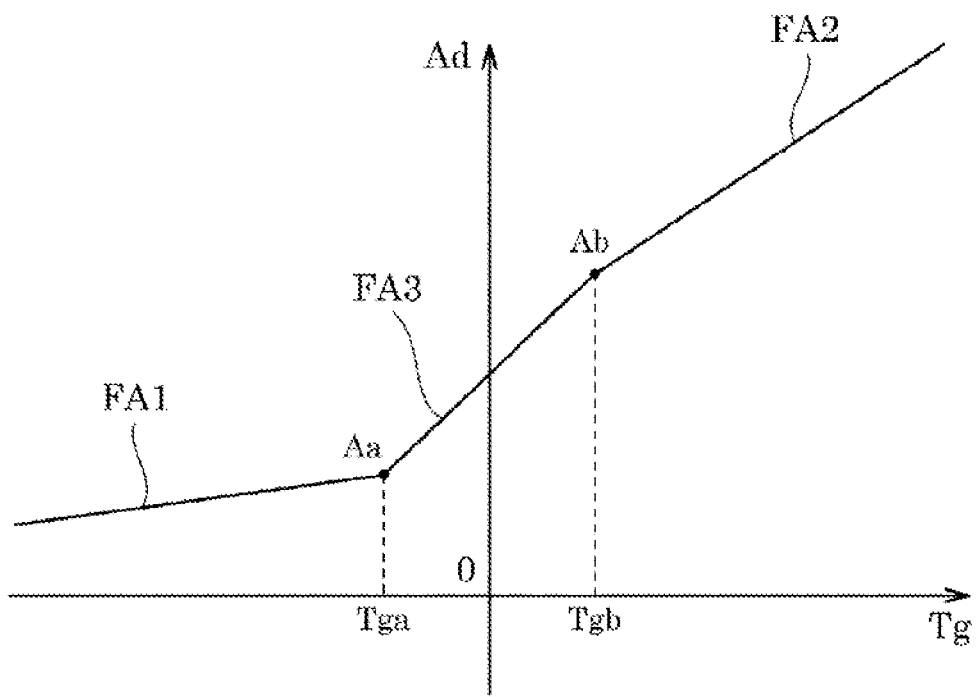

[Fig. 9]
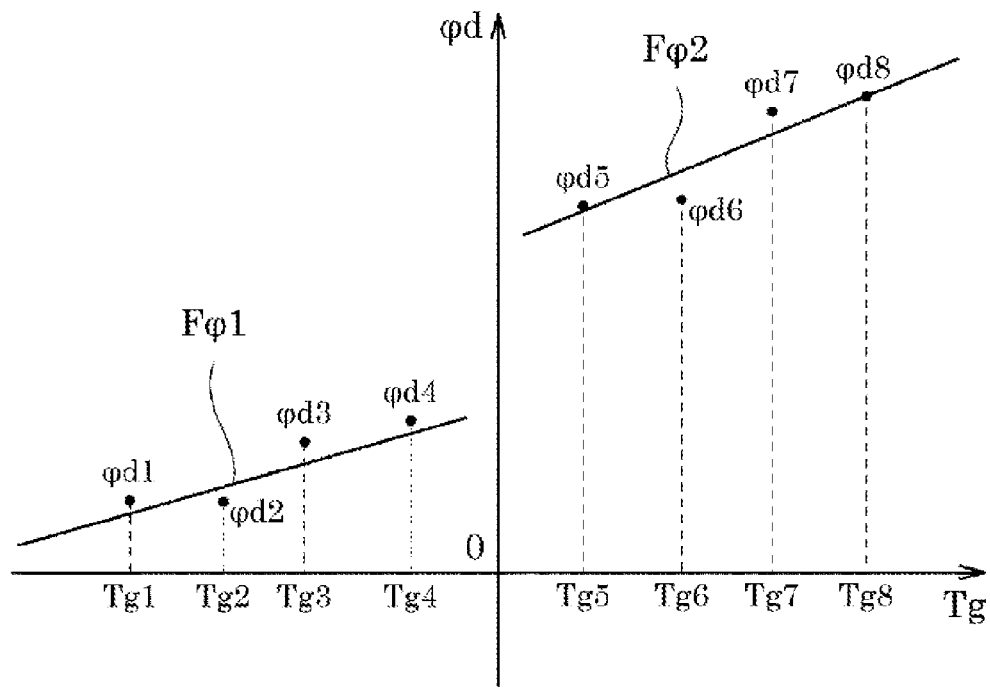
[Fig. 10]
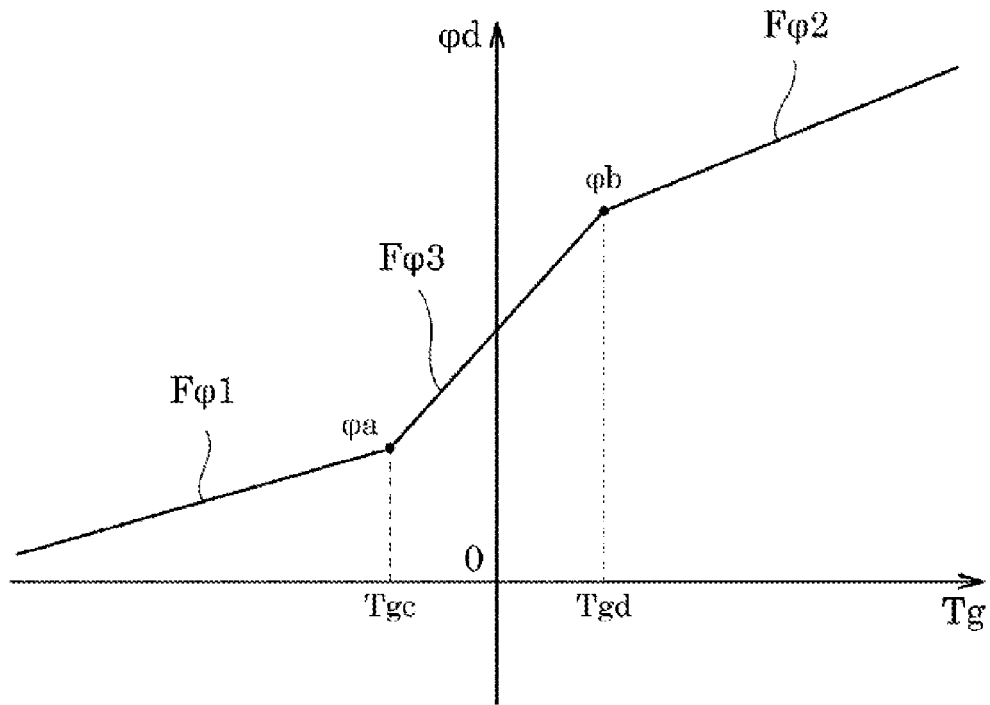

ANGULAR TRANSMISSION ERROR IDENTIFICATION SYSTEM, ANGULAR TRANSMISSION ERROR IDENTIFICATION METHOD, AND ROBOT SYSTEM

TECHNICAL FIELD

The present invention relates to an angular transmission error identification system, an angular transmission error identification method, and a robot system.

BACKGROUND ART

Conventionally, a robot control device has been known (see, for example, Patent Literature 1).

This robot control device includes correction signal generation unit for outputting a correction signal for canceling out error vibration (rotation unevenness) of Harmonic Drive (registered trademark) speed reducer. This correction signal generating unit includes a phase setting device that sets a phase difference and a distortion amplitude setting device that sets an amplitude, and the correction signal is calculated based on the set phase difference and amplitude. As the phase difference set in the phase setting device, a phase difference that minimizes the error vibration is determined by actual measurement. Further, for the phase difference set in the phase setting device, an appropriate value is determined by actually measuring or calculating the amplitude value of the error vibration or gradually changing the set value.

CITATION LIST

Patent Literature

PTL 1: JP S63-153610 A

SUMMARY OF INVENTION

Technical Problem

Incidentally, an appropriate phase difference and an appropriate amplitude may change due to a change in gravitational torque acting on a joint and a speed reducer. However, the robot control device described in Patent Literature 1 sometimes fails to generate a correction signal for canceling out the error vibration because the phase difference and the amplitude deviate from appropriate values due to changes in gravitational torque.

Solution to Problem

In order to solve the above-mentioned problem, according to one mode of the present invention, there is provided an angular transmission error identification system that identifies an angular transmission error of a speed reducer of a robot arm including a joint that is rotationally driven by a motor via the speed reducer, the angular transmission error identification system including an identification unit that calculates an amplitude parameter and a phase parameter of an angular transmission error identification function, which is a periodic function that models an angular transmission error of the speed reducer and has the amplitude parameter and the phase parameter, and identifies the angular transmission error using the angular transmission error identification function, in which, when a gravitational torque current value, which is a gravitational torque value acting on the joint when the angular transmission error of the speed reducer is identified, is included in a predetermined numerical range which is a negative numerical range, the identification unit calculates the amplitude parameter corresponding to the gravitational torque current value using a first amplitude function that represents a correlation between the amplitude parameter and the gravitational torque value acting on the joint in a motion range in which the gravitational torque value acting on the joint takes a negative value in a motion range of the joint, when the gravitational torque current value is included in the predetermined numerical range which is the negative numerical range, the identification unit calculates the phase parameter corresponding to the gravitational torque current value using a first phase function that represents the correlation between the phase parameter and the gravitational torque value acting on the joint in the motion range in which the gravitational torque value acting on the joint takes a negative value in the motion range of the joint, when the gravitational torque current value is included in a predetermined numerical range which is a positive numerical range, the identification unit calculates the amplitude parameter corresponding to the gravitational torque current value using a second amplitude function that represents a correlation between the amplitude parameter and the gravitational torque value acting on the joint in a motion range in which the gravitational torque value acting on the joint takes a positive value in the motion range of the joint, and when the gravitational torque current value is included in the predetermined numerical range which is the positive numerical range, the identification unit calculates the phase parameter corresponding to the gravitational torque current value using a second phase function that represents the correlation between the phase parameter and the gravitational torque value acting on the joint in the motion range in which the gravitational torque value acting on the joint takes a positive value in the motion range of the joint.

According to this configuration, it is possible to identify the angular transmission error of the speed reducer using the periodic function having the phase parameter and the amplitude parameter corresponding to the gravitational torque acting on the joint. As a result, even when the gravitational torque acting on the joint changes, the angular transmission error of the speed reducer can be identified accurately, and the unstable behavior of the load connected to the output shaft of the speed reducer can be suppressed based on the identified angular transmission error.

Furthermore, the phase parameter and the amplitude parameter corresponding to the gravitational torque acting on the joint are calculated using different functions depending on whether the gravitational torque takes a positive value or a negative value. Therefore, even when the characteristics of the speed reducer are different depending on whether the gravitational torque is in the positive region or the negative region, the angular transmission error of the speed reducer can be identified accurately.

Advantageous Effects of Invention

The present invention can accurately identify the angular transmission error of the speed reducer, thereby producing an effect of compensating the angular transmission error of the speed reducer accurately.

BRIEF DESCRIPTION OF DRAWINGS

FIG. 1 is a diagram schematically showing a configuration example of a robot system according to an embodiment.

FIG. 2 is a block diagram schematically showing a configuration example of a control system of the robot system in FIG. 1.

FIG. 3 is an explanatory diagram of an angular transmission error.

FIG. 4 is an explanatory diagram illustrating an example of a minute motion range of a joint of a robot of the robot system in FIG. 1.

FIG. 5 is a diagram illustrating an example of a periodic function of a predetermined frequency component calculated by a minute region amplitude/phase calculation unit of the robot system in FIG. 1.

FIG. 6A is a flowchart showing an operation example of the robot system in FIG. 1.

FIG. 6B is a flowchart showing an operation example of the robot system in FIG. 1.

FIG. 7 is a graph showing an example of a first amplitude function and a second amplitude function calculated by a torque-amplitude correlation calculation unit of the robot system in FIG. 1.

FIG. 8 is a graph showing an example of the first amplitude function, the second amplitude function, and a third amplitude function calculated by a torque-amplitude correlation calculation unit of the robot system in FIG. 1.

FIG. 9 is a graph showing an example of a first phase function and a second phase function calculated by a torque-phase correlation calculation unit of the robot system in FIG. 1.

FIG. 10 is a graph showing an example of the first phase function, the second phase function, and a third phase function calculated by the torque-phase correlation calculation unit of the robot system in FIG. 1.

DESCRIPTION OF EMBODIMENTS

According to one mode, there is provided an angular transmission error identification system that identifies an angular transmission error of a speed reducer of a robot arm including a joint that is rotationally driven by a motor via the speed reducer, the angular transmission error identification system including an identification unit that calculates an amplitude parameter and a phase parameter of an angular transmission error identification function, which is a periodic function that models an angular transmission error of the speed reducer and has the amplitude parameter and the phase parameter, and identifies the angular transmission error using the angular transmission error identification function, in which, when a gravitational torque current value, which is a gravitational torque value acting on the joint when the angular transmission error of the speed reducer is identified, is included in a predetermined numerical range which is a negative numerical range, the identification unit calculates the amplitude parameter corresponding to the gravitational torque current value using a first amplitude function that represents a correlation between the amplitude parameter and the gravitational torque value acting on the joint in a motion range in which the gravitational torque value acting on the joint takes a negative value in a motion range of the joint, when the gravitational torque current value is included in the predetermined numerical range which is the negative numerical range, the identification unit calculates the phase parameter corresponding to the gravitational torque current value using a first phase function that represents the correlation between the phase parameter and the gravitational torque value acting on the joint in the motion range in which the gravitational torque value acting on the joint takes a negative value in the motion range of the joint, when the gravitational torque current value is included in a predetermined numerical range which is a positive numerical range, the identification unit calculates the amplitude parameter corresponding to the gravitational torque current value using a second amplitude function that represents a correlation between the amplitude parameter and the gravitational torque value acting on the joint in a motion range in which the gravitational torque value acting on the joint takes a positive value in the motion range of the joint, and when the gravitational torque current value is included in the predetermined numerical range which is the positive numerical range, the identification unit calculates the phase parameter corresponding to the gravitational torque current value using a second phase function that represents the correlation between the phase parameter and the gravitational torque value acting on the joint in the motion range in which the gravitational torque value acting on the joint takes a positive value in the motion range of the joint.

According to this configuration, it is possible to identify the angular transmission error of the speed reducer using the periodic function having the phase parameter and the amplitude parameter corresponding to the gravitational torque acting on the joint. As a result, even when the gravitational torque acting on the joint changes, the angular transmission error of the speed reducer can be identified accurately, and the unstable behavior of the load connected to the output shaft of the speed reducer can be suppressed based on the identified angular transmission error.

Furthermore, the phase parameter and the amplitude parameter corresponding to the gravitational torque acting on the joint are calculated using different functions depending on whether the gravitational torque takes a positive value or a negative value. Therefore, even when the characteristics of the speed reducer are different depending on whether the gravitational torque is in the positive region or the negative region, the angular transmission error of the speed reducer can be identified accurately.

The angular transmission error identification system may further include: a minute region amplitude/phase calculation unit that calculates a minute motion range amplitude which is an amplitude of a predetermined frequency component of the angular transmission error of the speed reducer of a minute motion range and a minute motion range phase which is a phase thereof for each of a plurality of minute motion ranges arranged in a turning direction of the joint included in the motion range of the joint; a minute region gravitational torque value calculation unit that calculates a corresponding gravitational torque value which is a gravitational torque value acting on the joint in the corresponding minute motion range for each of the plurality of minute motion ranges; a torque-amplitude correlation calculation unit that calculates the first amplitude function and the second amplitude function representing a correlation between the minute motion range amplitude and the corresponding gravitational torque value, the first amplitude function being a function calculated based on the minute motion range amplitude and the corresponding gravitational torque value in the minute motion range in which the corresponding gravitational torque value takes a negative value among the plurality of minute motion ranges calculated by the minute region amplitude/phase calculation unit, the second amplitude function being a function calculated based on the minute motion range amplitude and the corresponding gravitational torque value in the minute motion range in which the corresponding gravitational torque value takes a positive value among the plurality of minute motion ranges calculated by the minute region amplitude/phase calculation unit; and a torque-phase correlation calculation unit that calculates the first phase function and the second phase function, the first phase function being a function calculated based on the minute motion range phase and the corresponding gravitational torque value in the minute motion range in which the corresponding gravitational torque value takes a negative value among the plurality of minute motion ranges calculated by the minute region amplitude/phase calculation unit, the second phase function being a function calculated based on the minute motion range phase and the corresponding gravitational torque value in the minute motion range in which the corresponding gravitational torque value takes a positive value among the plurality of minute motion ranges calculated by the minute region amplitude/phase calculation unit.

According to this configuration, the correlation between the amplitude parameter and the gravitational torque value and the correlation between the phase parameter and the gravitational torque value can be calculated accurately.

The torque-amplitude correlation calculation unit may represent the first amplitude function and the second amplitude function as a linear function using a least square method, and the torque-phase correlation calculation unit may represent the first phase function and the second phase function as a linear function using a least square method.

According to this configuration, it is possible to appropriately calculate the first amplitude function, the second amplitude function, the first phase function, and the second phase function.

The torque-phase correlation calculation unit may represent the first phase function and the second phase function as a linear function using a weighted least square method weighted by a value of an amplitude parameter of the corresponding minute motion range.

According to this configuration, it is possible to accurately calculate the first phase function and the second phase function.

The torque-amplitude correlation calculation unit may further calculate a third amplitude function, the third amplitude function being a function that passes through an amplitude value corresponding to a first predetermined value in which the gravitational torque value in the first amplitude function takes a negative value, and an amplitude value corresponding to a second predetermined value in which the gravitational torque value in the second amplitude function takes a positive value, the torque-phase correlation calculation unit may further calculate a third phase function, the third phase function being a function that passes through a phase value corresponding to a third predetermined value in which the gravitational torque value in the first phase function takes a negative value, and a phase value corresponding to a fourth predetermined value in which the gravitational torque value in the second phase function takes a positive value, and, when the gravitational torque current value is smaller than the first predetermined value, the identification unit may calculate the amplitude parameter corresponding to the gravitational torque current value using the first amplitude function, when the gravitational torque current value is larger than the first predetermined value and smaller than the second predetermined value, the identification unit may calculate the amplitude parameter corresponding to the gravitational torque current value using the third amplitude function, when the gravitational torque current value is larger than the second predetermined value, the identification unit may calculate the amplitude parameter corresponding to the gravitational torque current value using the second amplitude function, when the gravitational torque current value is smaller than the third predetermined value, the identification unit may calculate the phase parameter corresponding to the gravitational torque current value using the first phase function, when the gravitational torque current value is larger than the third predetermined value and smaller than the fourth predetermined value, the identification unit may calculate the phase parameter corresponding to the gravitational torque current value using the third phase function, and when the gravitational torque current value is larger than the fourth predetermined value, the identification unit may calculate the phase parameter corresponding to the gravitational torque current value using the second phase function.

According to this configuration, it is possible to smoothly compensate the angular transmission error in a section where the gravitational torque value strides zero.

The torque-amplitude correlation calculation unit may represent the third amplitude function as a linear function, and the torque-phase correlation calculation unit may represent the third phase function as a linear function.

According to this configuration, it is possible to appropriately calculate the third amplitude function and the third phase function.

According to one mode, there is provided an angular transmission error identification method for identifying an angular transmission error of a speed reducer of a robot arm including a joint that is rotationally driven by a motor via the speed reducer, the angular transmission error identification method including a minute region amplitude/phase calculation step of calculating a minute motion range amplitude which is an amplitude of a predetermined frequency component of the angular transmission error of the speed reducer of a minute motion range and a minute motion range phase which is a phase thereof for each of a plurality of minute motion ranges arranged in a turning direction of the joint included in the motion range of the joint; a minute region gravitational torque value calculation step of calculating a corresponding gravitational torque value which is a gravitational torque value acting on the joint in the corresponding minute motion range for each of the plurality of minute motion ranges; a torque-amplitude correlation calculation step of calculating the first amplitude function and the second amplitude function representing a correlation between the minute motion range amplitude and the corresponding gravitational torque value, the first amplitude function being a function calculated based on the minute motion range amplitude and the corresponding gravitational torque value in the minute motion range in which the corresponding gravitational torque value takes a negative value among the plurality of minute motion ranges calculated in the minute region amplitude/phase calculation step, the second amplitude function being a function calculated based on the minute motion range amplitude and the corresponding gravitational torque value in the minute motion range in which the corresponding gravitational torque value takes a positive value among the plurality of minute motion ranges calculated in the minute region amplitude/phase calculation step; a torque-phase correlation calculation step of calculating the first phase function and the second phase function representing the correlation between the minute motion range phase and the corresponding gravitational torque value, the first phase function being a function calculated based on the minute motion range phase and the corresponding gravitational torque value in the minute motion range in which the corresponding gravitational torque value takes a negative value among phases of the plurality of minute motion ranges calculated in the minute region amplitude/phase calculation step, the second phase function being a function calculated based on the minute motion range phase and the corresponding gravitational torque value in the minute motion range in which the corresponding gravitational torque value takes a positive value among the phase of the plurality of minute motion ranges calculated in the minute region amplitude/phase calculation step; and an identification step of calculating an amplitude parameter and a phase parameter of an angular transmission error identification function that models an angular transmission error of the speed reducer and has the amplitude parameter and the phase parameter, and identifying the angular transmission error using the angular transmission error identification function, in which, when a gravitational torque current value, which is a gravitational torque value acting on the joint when the angular transmission error of the speed reducer is identified, is included in a predetermined numerical range which is a negative numerical range, the identification step calculates the amplitude parameter corresponding to the gravitational torque current value using the first amplitude function, when the gravitational torque current value is included in the predetermined numerical range which is the negative numerical range, the identification step calculates the phase parameter corresponding to the gravitational torque current value using the first phase function, when the gravitational torque current value is included in a predetermined numerical range which is a positive numerical range, the identification step calculates the amplitude parameter corresponding to the gravitational torque current value using the second amplitude function, and when the gravitational torque current value is included in the predetermined numerical range which is the positive numerical range, the identification step calculates the phase parameter corresponding to the gravitational torque current value using the second phase function.

According to this configuration, it is possible to identify the angular transmission error of the speed reducer using the periodic function having the phase parameter and the amplitude parameter corresponding to the gravitational torque acting on the joint. As a result, even when the gravitational torque acting on the joint changes, the angular transmission error of the speed reducer can be identified accurately, and the unstable behavior of the load connected to the output shaft of the speed reducer can be suppressed based on the identified angular transmission error.

Furthermore, the phase parameter and the amplitude parameter corresponding to the gravitational torque acting on the joint are calculated using different functions depending on whether the gravitational torque takes a positive value or a negative value. Therefore, even when the characteristics of the speed reducer are different depending on whether the gravitational torque is in the positive region or the negative region, the angular transmission error of the speed reducer can be identified accurately.

According to one mode, there is provided a robot system including an angular transmission error identification system that identifies an angular transmission error of a speed reducer of a robot arm including a joint that is rotationally driven by a motor via the speed reducer, the angular transmission error identification system including an identification unit that calculates an amplitude parameter and a phase parameter of an angular transmission error identification function, which is a periodic function that models an angular transmission error of the speed reducer and has the amplitude parameter and the phase parameter, and identifies the angular transmission error using the angular transmission error identification function, in which, when a gravitational torque current value, which is a gravitational torque value acting on the joint when the angular transmission error of the speed reducer is identified, is included in a predetermined numerical range which is a negative numerical range, the identification unit calculates the amplitude parameter corresponding to the gravitational torque current value using a first amplitude function that represents a correlation between the amplitude parameter and the gravitational torque value acting on the joint in a motion range in which the gravitational torque value acting on the joint takes a negative value in a motion range of the joint, when the gravitational torque current value is included in the predetermined numerical range which is the negative numerical range, the identification unit calculates the phase parameter corresponding to the gravitational torque current value using a first phase function that represents the correlation between the phase parameter and the gravitational torque value acting on the joint in the motion range in which the gravitational torque value acting on the joint takes a negative value in the motion range of the joint, when the gravitational torque current value is included in a predetermined numerical range which is a positive numerical range, the identification unit calculates the amplitude parameter corresponding to the gravitational torque current value using a second amplitude function that represents a correlation between the amplitude parameter and the gravitational torque value acting on the joint in a motion range in which the gravitational torque value acting on the joint takes a positive value in the motion range of the joint, and when the gravitational torque current value is included in the predetermined numerical range which is the positive numerical range, the identification unit calculates the phase parameter corresponding to the gravitational torque current value using a second phase function that represents the correlation between the phase parameter and the gravitational torque value acting on the joint in the motion range in which the gravitational torque value acting on the joint takes a positive value in the motion range of the joint.

According to this configuration, it is possible to identify the angular transmission error of the speed reducer using the periodic function having the phase parameter and the amplitude parameter corresponding to the gravitational torque acting on the joint. As a result, even when the gravitational torque acting on the joint changes, the angular transmission error of the speed reducer can be identified accurately, and the unstable behavior of the load connected to the output shaft of the speed reducer can be suppressed based on the identified angular transmission error.

Furthermore, the phase parameter and the amplitude parameter corresponding to the gravitational torque acting on the joint are calculated using different functions depending on whether the gravitational torque takes a positive value or a negative value. Therefore, even when the characteristics of the speed reducer are different depending on whether the gravitational torque is in the positive region or the negative region, the angular transmission error of the speed reducer can be identified accurately.

Hereinafter, embodiments will be described with reference to the drawings. Note that the present invention is not limited to the present embodiment. Note that, in the followings, the same or corresponding elements are denoted by the same reference symbols throughout all the drawings, and redundant description thereof is omitted.

FIG. 1 is a diagram schematically showing a configuration example of a robot system 100. FIG. 2 is a block diagram schematically showing a configuration example of a control system of the robot system 100.

As shown in FIG. 1 and FIG. 2, the robot system 100 is a system including a speed reducer angular transmission error identification system that identifies an angular transmission error of a speed reducer 13 of a robot arm 4 including a joint 7 that is rotationally driven by a motor 11 via the speed reducer 13. The robot system 100 includes a robot 1 and a control device 2, and the control device 2 identifies an angular transmission error of the speed reducer 13.

[Configuration Example of Robot]

As shown in FIG. 1, the robot 1 is an industrial robot which is an articulated robot (multi-joint robot). The robot 1 includes a base 3, a robot arm 4, and a hand 14.

The robot arm 4 is a robot arm that moves the hand 14 with respect to the base 3, and includes at least one joint. Among these, for convenience of explanation, the joint that identifies and compensates the angular transmission error is hereinafter referred to as a joint 7. The joint 7 is, for example, a joint that turns around a turning axis line that extends in the horizontal direction. Accordingly, the posture of the elements (including the hand 14) connected to the distal end side with respect to the joint 7 is changed by the turning of the joint 7, and gravitational torque acting on the joint 7 is changed. As shown in FIG. 2, the robot arm 4 is provided with a joint drive unit 9 that drives the joint 7. The joint drive unit 9 includes a motor 11, an encoder 12, and a speed reducer 13. The motor 11 is a drive source that turns the joint 7, and is, for example, a servomotor. The encoder 12 detects a rotation angle of an output shaft 11a of the motor 11. The speed reducer 13 includes an input shaft 13a connected to the output shaft 11a of the motor 11, decelerates the rotation of the output shaft a of the motor 11 at a predetermined reduction ratio, and outputs it from the output shaft 13b.

The speed reducer 13 is, for example, a strain wave gearing (Harmonic Drive (registered trademark)). The strain wave gearing includes a circular spline, a flex spline, and a wave generator. The circular spline is a rigid internal gear, and is provided integrally with the housing for example. The flex spline is a flexible external gear and meshes with the circular spline. The flex spline has fewer teeth than the circular spline and is connected to the output shaft 13b of the speed reducer 13. The wave generator is an elliptical cam that is in contact with the inner side of the flex spline, and is connected to the input shaft 13a of the speed reducer 13. Then, as the input shaft 13a of the speed reducer 13 rotates, the wave generator moves the meshing position between the flex spline and the circular spline, and the flex spline rotates around the rotary axis according to the difference in the number of teeth between the circular spline and the flex spline, so that the output shaft 13b of the speed reducer 13 rotates. The strain wave gearing has characteristics suitable for a speed reducer of a robot drive mechanism because of its features such as small size and light weight, high reduction ratio, high torque capacity, and non-backlash.

By the way, as shown in FIG. 3, in the speed reducer such as the strain wave gearing, there occurs an angular transmission error which is a difference between a theoretical output rotation angle obtained by multiplying an input rotation angle input to the speed reducer by a reduction ratio and the actual output rotation angle due to a processing error or the like. This angular transmission error changes periodically along with the rotation of the output shaft of the motor. Such an angular transmission error ATE of the speed reducer output shaft can be approximately expressed by a model using a function according to the following equation (1).

[Equation 1]

$$\theta_{ate} = A \sin(2\pi k\theta + \phi) \quad (1)$$

Note that, $\theta_{ate}$ is angular transmission error [rad]

A is amplitude of angular transmission error model function k is frequency of angular transmission error model function (number of waves of angular transmission error per rotation of output shaft of motor)

θ is rotation angle of input shaft of speed reducer (output shaft of servo motor)

φ is phase of angular transmission error model function

Among these, the frequency f is a value that depends on the structure (type) of the speed reducer 13, and, for example, it has been found that a component having a frequency of 2 has a particularly great influence on the angular transmission error of the strain wave gearing.

[Configuration Example of Control Device]

As shown in FIG. 2, the control device 2 controls the robot 1. The control device 2 includes a calculation unit 21, a storage unit 22, and a servo amplifier 24 provided corresponding to the joint 7.

The calculation unit 21 is configured by a calculator such as a microcontroller, CPU, ASIC, or programmable logic device (PLD) such as FPGA. The calculation unit may be configured by a single controller that performs centralized control, or may be configured by a plurality of controllers that perform distributed control in cooperation with each other. The calculation unit 21 includes a command unit 41, a minute region amplitude/phase calculation unit 42, a minute region gravitational torque value calculation unit 43, a torque-amplitude correlation calculation unit 44, a torque-phase correlation calculation unit 45, and an identification unit 46. The command unit 41, the minute region amplitude/phase calculation unit 42, the minute region gravitational torque value calculation unit 43, the torque-amplitude correlation calculation unit 44, the torque-phase correlation calculation unit 45, and the identification unit 46 are functional blocks that are realized when the calculation unit 21 executes a predetermined control program.

The command unit 41 generates a target position based on the operation program and outputs it. The output target position is input to the servo amplifier 24. The command unit 41 corrects the target position based on the angular transmission error identified by the identification unit 46, and outputs it.

FIG. 4 is an explanatory diagram illustrating an example of first minute motion range Rd1 to eighth minute motion range Rd8 of the joint 7 of the robot 1. FIG. 5 is a diagram illustrating an example of a periodic function of a predetermined frequency component calculated by the minute region amplitude/phase calculation unit 42.

As shown in FIG. 4 and FIG. 5, the minute region amplitude/phase calculation unit 42 calculates a minute motion range amplitude Ad (see FIG. 7) which is an amplitude of a predetermined frequency of an angular transmission error of the minute motion range and a minute motion range phase φd (see FIG. 9) which is a phase thereof for each of the plurality of minute motion ranges arranged in the turning direction of the joint 7 included in the motion range R of the joint 7. The minute motion range is a region set in advance at predetermined intervals in the turning region of the joint 7. For example, eight preset minute motion ranges Rd1 to Rd8 are set. In FIG. 4, the element indicated by 7a is a link on the proximal end side of the robot arm 4 with respect to the joint 7, and the element indicated by 7b is a link on the distal end side of the robot arm 4 with respect to the joint 7.

The minute region amplitude/phase calculation unit 42 calculates, for example, an angular transmission error in the minute motion range by actual measurement. That is, for example, the output shaft 13b of the speed reducer 13 is provided with an encoder (not shown) that detects the rotation angle of the output shaft 13b. Then, the minute region amplitude/phase calculation unit 42 operates the joint 7 via the command unit 41, and calculates the change in the angular transmission error, which is the difference between the theoretical rotation angle of the output shaft 13b of the speed reducer 13 and the rotation angle of the output shaft 13b of the speed reducer 13 output from the encoder. Then, the minute region amplitude/phase calculation unit 42 extracts a predetermined frequency component (for example, f=2) from the change in the calculated angular transmission error, and calculates the amplitude (minute motion range amplitude Ad) and the phase (minute motion range phase φd) of the sine wave according to this frequency component. Note that the frequency f is a value that depends on the structure (type) of the speed reducer 13, and in the speed reducer 13 which is a strain wave gearing reducer, the frequency f is preliminarily defined as 2 that has a particularly great influence on the angular transmission error.

In the present embodiment, the minute region amplitude/phase calculation unit 42 detects the angular transmission error based on the information acquired by the encoder 12 that detects the rotation angle of the output shaft 13b of the speed reducer 13, but the present invention is not limited thereto. Instead, the minute region amplitude/phase calculation unit 42 may detect a change in the current value for controlling another joint resulting from the motion of the joint 7 that identifies the angular transmission error, and may calculate the angular transmission error of the joint 7 analytically based on the change in the current value.

The minute region gravitational torque value calculation unit 43 calculates the corresponding gravitational torque value Tg acting on the joint 7 for each of the minute motion ranges Rd1 to Rd8. The corresponding gravitational torque value Tg is a gravitational torque value that acts on the joint 7 in the corresponding minute motion range, and is, for example, a value that is analytically calculated from the posture of the robot arm 4 or the like. Instead, a sensor for detecting the gravitational torque may be provided to the joint 7 to detect the gravitational torque value acting on the joint 7. As described above, the joint 7 is a joint that turns around the turning axis line that extends in the horizontal direction, and by the turning of the joint 7, the postures of the elements of the robot arm 4 connected to the distal end side with respect to the joint 7 and the hand 14 change, and the gravitational torque acting on the joint 7 changes. As shown in FIG. 4, the gravitational torque value when the robot arm 4 is gradually laid by turning the joint 7 to one side from the state where the gravitational torque does not act on the joint 7, that is, the state where the gravitational torque value acting on the joint 7 is zero, is represented with a plus sign. The state is that the robot arm 4 extends upward, for example. Further, the gravitational torque value when the robot arm 4 is gradually laid by turning the joint 7 to the other side from the state where the gravitational torque does not act on the joint 7, that is the state where the gravitational torque value acting on the joint 7 is zero, is represented with a minus sign.

Then, the minute region gravitational torque value calculation unit 43 regards, for example, the gravitational torque value at the center of each minute motion range as the gravitational torque value of each minute motion range. However, the present invention is not limited to this, and the minute region gravitational torque value calculation unit 43 may regard the average value of the gravitational torque values acting on the joint 7 in each minute motion range as the gravitational torque value of each minute motion range.

FIG. 7 is a graph showing an example of the first amplitude function FA1 and the second amplitude function FA2 calculated by the torque-amplitude correlation calculation unit 44 of the robot system 100.

As shown in FIG. 7, the torque-amplitude correlation calculation unit 44 calculates the first amplitude function FA1 and the second amplitude function FA2 representing the correlation between the minute motion range amplitude Ad and the corresponding gravitational torque value Tg. The first amplitude function FA1 is a function calculated based on the minute motion range amplitude Ad (Ad1 to Ad4 in FIG. 7) and the corresponding gravitational torque value Tg (Tg1 to Tg4 in FIG. 7) in the minute motion range in which the corresponding gravitational torque value Tg takes a negative value among the minute motion ranges Rd1 to Rd8 calculated by the minute region amplitude/phase calculation unit 42. In the present embodiment, it is defined that the corresponding gravitational torque values Tg1 to Tg4 of the minute motion ranges Rd1 to Rd4 take a negative value.

Further, the second amplitude function FA2 is a function calculated based on the minute motion range amplitude Ad (Ad5 to Ad8 in FIG. 7) and the corresponding gravitational torque value Tg (Tg5 to Tg8 in FIG. 7) in the minute motion range in which the corresponding gravitational torque value Tg takes a positive value among the minute motion ranges Rd1 to Rd8 calculated by the minute region amplitude/phase calculation unit 42. In the present embodiment, it is defined that the corresponding gravitational torque values Tg5 to Tg8 of the minute motion ranges Rd5 to Rd8 take a positive value.

The torque-amplitude correlation calculation unit 44 is configured to represent the first amplitude function FA1 and the second amplitude function FA2 as a linear function using the least square method. That is, the torque-amplitude correlation calculation unit 44 calculates coefficients according to the slope and intercept of the first amplitude function FA1 and the second amplitude function FA2 expressed by the linear function using the least square method.

FIG. 8 is a graph showing an example of the first amplitude function FA, the second amplitude function FA2, and the third amplitude function FA3 calculated by the torque-amplitude correlation calculation unit 44 of the robot system 100.

Further, the torque-amplitude correlation calculation unit 44 further calculates the third amplitude function FA3 as shown in FIG. 8. The third amplitude function FA3 is a function that passes through an amplitude value Aa corresponding to the first predetermined value Tga in which the gravitational torque value Tg in the first amplitude function FA1 takes a negative value, and an amplitude value Ab corresponding to the second predetermined value Tgb in which the gravitational torque value Tg in the second amplitude function FA2 takes a positive value. The torque-amplitude correlation calculation unit 44 represents the third amplitude function FA3 as a linear function that passes through the amplitude value Aa and the amplitude value Ab. That is, the torque-amplitude correlation calculation unit 44 calculates a coefficient according to the slope and intercept of the third amplitude function FA3 represented by the linear function.

FIG. 9 is a graph showing an example of the first phase function Fφ1 and the second phase function Fφ2 calculated by the torque-phase correlation calculation unit 45 of the robot system 100.

As shown in FIG. 9, the torque-phase correlation calculation unit 45 calculates the first phase function Fφ1 and the second phase function Fφ2 representing the correlation between the minute motion range phase φd and the corresponding gravitational torque value Tg. The first phase function Fφ1 is a function calculated based on the minute motion range phase φd (φd1 to φd4 in FIG. 9) and the corresponding gravitational torque value Tg (Tg5 to Tg8 in FIG. 9) in the minute motion ranges Rd1 to Rd4 in which the corresponding gravitational torque value Tg takes a negative value.

Further, the second phase function Fφ2 is a function calculated based on the minute motion range phase φd (φd5 to φd8 in FIG. 9) and the corresponding gravitational torque value Tg (Tg5 to Tg8 in FIG. 9) in the minute motion ranges Rd5 to Rd8 in which the corresponding gravitational torque value Tg takes a positive value.

Then, the torque-amplitude correlation calculation unit 44 represents the first phase function Fφ1 and the second phase function Fφ2 as a linear function using the weighted least square method weighted by the value A of the amplitude parameter of the corresponding minute motion range. That is, for example, the phase φd1 of the minute motion range Rd1 is weighted by the amplitude Ad1, and the other phases are weighted by the corresponding amplitude in the same manner. Then, the torque-phase correlation calculation unit 45 calculates coefficients according to the slope and intercept of the first phase function Fφ1 and the second phase function Fφ2 expressed by the linear function using the weighted least square method.

FIG. 10 is a graph showing an example of the first phase function Fφ1, the second phase function Fφ2, and the third phase function Fφ3 calculated by the torque-phase correlation calculation unit 45 of the robot system 100.

Then, as shown in FIG. 10, the torque-phase correlation calculation unit 45 further calculates the third phase function Fφ3. The third phase function Fφ3 is a function that passes through a phase value φa corresponding to the third predetermined value Tgc in which the gravitational torque value Tg in the first phase function Fφ1 takes a negative value, and a phase value φb corresponding to the fourth predetermined value Tgd in which the gravitational torque value Tg in the second phase function Fφ2 takes a positive value. The torque-phase correlation calculation unit 45 represents the third phase function as a linear function that passes through the phase value pa and the phase value φb. That is, the torque-phase correlation calculation unit 45 calculates a coefficient according to the slope and intercept of the third phase function Fφ3 represented by the linear function. In the present embodiment, the third predetermined value Tgc is the same value as the first predetermined value Tga, but may be a different value. Further, the fourth predetermined value Tgd is the same value as the second predetermined value Tgb, but may be a different value.

As shown in FIG. 2, the identification unit 46 calculates the amplitude parameter A and the phase parameter φp of the angular transmission error identification function F2 according to the following equation (2), which is a periodic function that models the angular transmission error of the speed reducer 13 and has the amplitude parameter and the phase parameter, and identifies the angular transmission error $\theta_{ate}$ using the angular transmission error identification function F2.

[Equation 2]

$$\theta_{ate} = A \sin(2\pi k \theta + \phi) \quad (2)$$

Note that, $\theta_{ate}$ is angular transmission error [rad]

A is amplitude parameter k is predetermined frequency (number of waves of angular transmission error per rotation of output shaft of motor)

$\theta$ is rotation angle of input shaft of speed reducer (output shaft of servo motor)

$\phi$ is phase parameter

When the gravitational torque current value Tgp, which is the gravitational torque value acting on the joint when the angular transmission error of the speed reducer 13 is identified, is smaller than the first predetermined value Tga, the identification unit 46 calculates an amplitude parameter corresponding to the gravitational torque value Tg using the first amplitude function FA1. The gravitational torque current value Tgp is a value that is analytically calculated from the posture of the robot arm 4 or the like. Instead, a sensor for detecting the gravitational torque may be provided to the joint 7 to detect the gravitational torque value acting on the joint 7. Further, when the gravitational torque current value Tgp is larger than the first predetermined value Tga and smaller than the second predetermined value Tgb, the identification unit 46 calculates the amplitude parameter corresponding to the gravitational torque value Tg using the third amplitude function FA3. In the present embodiment, when the gravitational torque current value Tgp is equal to or larger than the first predetermined value Tga and equal to or smaller than the second predetermined value Tgb, the identification unit 46 calculates the amplitude parameter corresponding to the gravitational torque value Tg using the third amplitude function FA3. Further, when the gravitational torque current value Tgp is larger than the second predetermined value Tgb, the identification unit 46 calculates an amplitude parameter corresponding to the gravitational torque value Tg using the second amplitude function FA2.

Further, when the gravitational torque current value Tgp is smaller than the third predetermined value Tgc, the identification unit 46 calculates a phase parameter corresponding to the gravitational torque value Tg using the first phase function Fφ1. Further, when the gravitational torque current value Tgp is larger than the third predetermined value Tgc and smaller than the fourth predetermined value Tgd, the identification unit 46 calculates the phase parameter corresponding to the gravitational torque value Tg using the third phase function Fφ3. In the present embodiment, when the gravitational torque current value Tgp is equal to or larger than the third predetermined value Tgc and equal to or smaller than the fourth predetermined value Tgd, the identification unit 46 calculates the phase parameter corresponding to the gravitational torque value Tg using the third phase function Fφ3. Further, when the gravitational torque current value Tgp is larger than the fourth predetermined value Tgd, the identification unit 46 calculates a phase parameter corresponding to the gravitational torque value Tg using the second phase function Fφ2.

The storage unit 22 includes a memory such as a ROM and a RAM. A predetermined program is stored in the storage unit 22, and the calculation unit 21 reads and executes these programs so that various processes are performed. Further, the storage unit 22 stores information related to the ranges Rd1 to Rd8.

The servo amplifier 24 supplies current to the motor 11 based on the target position generated by the command unit 41.

Operation Example

Next, an operation example of the robot system 100 will be described.

FIG. 6A and FIG. 6B are flowcharts illustrating an operation example of the robot system 100.

First, as shown in FIG. 6A, the minute region amplitude/phase calculation unit 42 calculates the minute motion range amplitude Ad (Ad1 to Ad8) and minute motion range phase φd (φd1 to φd8) for each of the minute motion ranges Rd1 to Rd8 (minute region amplitude/phase calculation step) (Step S).

Next, the minute region gravitational torque value calculation unit 43 calculates the corresponding gravitational torque value Tg (Tg1 to Tg8) for each of the minute motion ranges Rd1 to Rd8 (minute region gravitational torque value calculation step)(Step S2).

Next, as shown in FIG. 7, the torque-amplitude correlation calculation unit 44 calculates the first amplitude function FA1 and the second amplitude function FA2 based on the calculated minute motion range amplitude Ad and the corresponding gravitational torque value Tg (torque-amplitude correlation calculation step) (Step S3).

Next, as shown in FIG. 8, the torque-amplitude correlation calculation unit 44 calculates the third amplitude function FA3 based on the calculated first amplitude function FA1 and second amplitude function FA2 (Step S4).

Next, as shown in FIG. 9, the torque-phase correlation calculation unit 45 calculates the first phase function Fφ1 and the second phase function Fφ2 based on the calculated minute motion range phase φd and corresponding gravitational torque value Tg (torque-phase correlation calculation step)(Step S5).

Next, as shown in FIG. 10, the torque-phase correlation calculation unit 45 calculates the third phase function Fφ3 based on the calculated first amplitude function Fφ1 and second amplitude function Fφ2 (Step S6).

Next, the identification unit 46 calculates the amplitude parameter and the phase parameter of the angular transmission error identification function F2, and identifies the angular transmission error using the angular transmission error identification function F2 (identification step)(Step S7).

At this time, as shown in FIG. 6B, first, the identification unit 46 compares the gravitational torque current value Tgp with the first predetermined value Tga and the second predetermined value Tgb (Step S71). When the gravitational torque current value Tgp is smaller than the first predetermined value Tga, the identification unit 46 calculates an amplitude parameter corresponding to the gravitational torque value Tg using the first amplitude function FA1 (Step S72). Further, when the gravitational torque current value Tgp is equal to or larger than the first predetermined value Tga and equal to or smaller than the second predetermined value Tgb, the identification unit 46 calculates an amplitude parameter corresponding to the gravitational torque value Tg using the third amplitude function FA3 (Step S73). Further, when the gravitational torque current value Tgp is larger than the second predetermined value Tgb, the identification unit 46 calculates an amplitude parameter corresponding to the gravitational torque value Tg using the second amplitude function FA2 (Step S74).

Next, the identification unit 46 compares the gravitational torque current value Tgp with the third predetermined value Tgc and the fourth predetermined value Tgd (Step S75). Then, when the gravitational torque current value Tgp is smaller than the third predetermined value Tgc, the identification unit 46 calculates a phase parameter corresponding to the gravitational torque value Tg using the first phase function Fφ1 (Step S76). Further, when the gravitational torque current value Tgp is equal to or larger than the third predetermined value Tgc and equal to or smaller than the fourth predetermined value Tgd, the identification unit 46 calculates a phase parameter corresponding to the gravitational torque value Tg using the third phase function Fφ3 (Step S77). Furthermore, when the gravitational torque current value Tgp is larger than the fourth predetermined value Tgd, the identification unit 46 calculates a phase parameter corresponding to the gravitational torque value Tg using the second phase function Fφ2 (Step S78).

Next, the identification unit 46 identifies an angular transmission error using the angular transmission error identification function F2 to which the calculated amplitude parameter and phase parameter are applied (Step S79).

As described above, when the gravitational torque current value Tgp is included in a predetermined numerical range which is a negative numerical range, the identification unit 46 calculates the amplitude parameter corresponding to the gravitational torque value Tg using the first amplitude function FA1. Further, when the gravitational torque current value Tgp is included in a predetermined numerical range which is a negative numerical range, the identification unit 46 calculates a phase parameter corresponding to the gravitational torque value Tg using the first phase function Fφ1. Further, when the gravitational torque current value Tgp is included in a predetermined numerical range which is a positive numerical range, the identification unit 46 calculates an amplitude parameter corresponding to the gravitational torque value Tg using the second amplitude function FA2. Further, when the gravitational torque current value Tgp is included in a predetermined numerical range which is a positive numerical range, the identification unit 46 calculates a phase parameter corresponding to the gravitational torque value Tg using the second phase function Fφ2.

Incidentally, in the region where the gravitational torque value is zero and the vicinity thereof, the characteristics related to the angular transmission of the speed reducer 13 change significantly, and the characteristics related to the angular transmission of the speed reducer 13 may be different between the region where the gravitational torque is positive and the region where the gravitational torque is negative. For example, when the speed reducer 13 is a strain wave gearing, in the region where the gravitational torque value is zero, the surface where the teeth of the circular spline and the teeth of the flex spline are in contact with each other is switched to the opposite side in the rotation direction of the wave generator, and the characteristics related to the angular transmission of the speed reducer 13 may change significantly.

However, in the present embodiment, the robot system 100 is configured such that the identification unit 46 that identifies the angular transmission error switches the function that serves as a basis for calculating the compensation value depending on whether the gravitational torque value takes a positive value or a negative value. Therefore, even when the characteristics related to the angular transmission error of the speed reducer 13 change significantly depending on whether the gravitational torque value takes a positive value or a negative value, the angular transmission error can be compensated more accurately.

In the section where the gravitational torque value strides zero, the third amplitude function FA3 gently connects the first amplitude function FA1 and the second amplitude function FA2, and the third phase function Fφ3 gently connects the first phase function Fφ1 and the second phase function Fφ2. Therefore, in the section where the characteristics related to the angular transmission error of the speed reducer 13 change abruptly (section where the gravitational torque value strides zero), the angular transmission error can be compensated smoothly.

As described above, the robot system 100 is configured to set the parameter of the angular transmission error identification function F2 based on the correlation between the parameter (the amplitude parameter and the phase parameter) of the angular transmission error identification function that models the angular transmission error and the gravitational torque acting on the joint to identify the angular transmission error. Therefore, the angular transmission error can be identified accurately when the gravitational torque acting on the joint changes. As a result, the angular transmission error can be compensated accurately.

In addition, the function serving as the basis for calculating the parameter (the amplitude parameter and the phase parameter) of the angular transmission error identification function F2 is switched depending on whether the gravitational torque value takes a positive value or a negative value. As a result, the angular transmission error can be identified more accurately.

<Modification>

In the above embodiment described above, the minute region amplitude/phase calculation unit 42 extracts one frequency component from the angular transmission error, and identifies the angular transmission error using the angular transmission error identification function calculated based on the frequency component. However, the present invention is not limited to this. Instead, the minute region amplitude/phase calculation unit 42 extracts a plurality of frequency components from the angular transmission error, and uses the sum of the angular transmission error identification function corresponding to each frequency component calculated based on these to identify the angular transmission error.

Based on the foregoing description, it is apparent for a person skilled in the art that many modifications and other embodiments may be made to the present invention. Therefore, the foregoing description should be interpreted only as an example and is provided for the purpose of teaching the best mode for carrying out the present invention to a person skilled in the art. The structures and/or functional details may be substantially modified without departing from the spirit of the present invention.

REFERENCE SIGNS LIST 1 robot
2 control device
4 robot arm
7 joint
9 joint drive unit
11 motor
12 encoder
13 speed reducer
46 identification unit
100 robot system

The invention claimed is:

1. An angular transmission error identification system that identifies an angular transmission error of a speed reducer of a robot arm including a joint that is rotationally driven by a motor via the speed reducer,
the angular transmission error identification system comprising an identification unit that calculates an amplitude parameter and a phase parameter of an angular transmission error identification function, which is a periodic function that models an angular transmission error of the speed reducer and has the amplitude parameter and the phase parameter, and identifies the angular transmission error using the angular transmission error identification function,
wherein, when a gravitational torque current value, which is a gravitational torque value acting on the joint when the angular transmission error of the speed reducer is identified, is included in a predetermined numerical range which is a negative numerical range, the identification unit calculates the amplitude parameter corresponding to the gravitational torque current value using a first amplitude function that represents a correlation between the amplitude parameter and the gravitational torque value acting on the joint in a motion range in which the gravitational torque value acting on the joint takes a negative value in a motion range of the joint, when the gravitational torque current value is included in the predetermined numerical range which is the negative numerical range, the identification unit calculates the phase parameter corresponding to the gravitational torque current value using a first phase function that represents the correlation between the phase parameter and the gravitational torque value acting on the joint in the motion range in which the gravitational torque value acting on the joint takes a negative value in the motion range of the joint, when the gravitational torque current value is included in a predetermined numerical range which is a positive numerical range, the identification unit calculates the amplitude parameter corresponding to the gravitational torque current value using a second amplitude function that represents a correlation between the amplitude parameter and the gravitational torque value acting on the joint in a motion range in which the gravitational torque value acting on the joint takes a positive value in the motion range of the joint, and when the gravitational torque current value is included in the predetermined numerical range which is the positive numerical range, the identification unit calculates the phase parameter corresponding to the gravitational torque current value using a second phase function that represents the correlation between the phase parameter and the gravitational torque value acting on the joint in the motion range in which the gravitational torque value acting on the joint takes a positive value in the motion range of the joint.

2. The angular transmission error identification system according to claim 1, further comprising:
a minute region amplitude/phase calculation unit that calculates a minute motion range amplitude which is an amplitude of a predetermined frequency component of the angular transmission error of the speed reducer of a minute motion range and a minute motion range phase which is a phase thereof for each of a plurality of minute motion ranges arranged in a turning direction of the joint included in the motion range of the joint;
a minute region gravitational torque value calculation unit that calculates a corresponding gravitational torque value which is a gravitational torque value acting on the joint in the corresponding minute motion range for each of the plurality of minute motion ranges;
a torque-amplitude correlation calculation unit that calculates the first amplitude function and the second amplitude function representing a correlation between the minute motion range amplitude and the corresponding gravitational torque value, the first amplitude function being a function calculated based on the minute motion range amplitude and the corresponding gravitational torque value in the minute motion range in which the corresponding gravitational torque value takes a negative value among the plurality of minute motion ranges calculated by the minute region amplitude/phase calculation unit, the second amplitude function being a function calculated based on the minute motion range amplitude and the corresponding gravitational torque value in the minute motion range in which the corresponding gravitational torque value takes a positive value among the plurality of minute motion ranges calculated by the minute region amplitude/phase calculation unit; and a torque-phase correlation calculation unit that calculates the first phase function and the second phase function, the first phase function being a function calculated based on the minute motion range phase and the corresponding gravitational torque value in the minute motion range in which the corresponding gravitational torque value takes a negative value among the plurality of minute motion ranges calculated by the minute region amplitude/phase calculation unit, the second phase function being a function calculated based on the minute motion range phase and the corresponding gravitational torque value in the minute motion range in which the corresponding gravitational torque value takes a positive value among the plurality of minute motion ranges calculated by the minute region amplitude/phase calculation unit.

3. The angular transmission error identification system according to claim 2,
wherein the torque-amplitude correlation calculation unit represents the first amplitude function and the second amplitude function as a linear function using a least square method, and
wherein the torque-phase correlation calculation unit represents the first phase function and the second phase function as a linear function using a least square method.

4. The angular transmission error identification system according to claim 3, wherein the torque-phase correlation calculation unit represents the first phase function and the second phase function as a linear function using a weighted least square method weighted by a value of an amplitude parameter of the corresponding minute motion range.

5. The angular transmission error identification system according to claim 2,
wherein the torque-amplitude correlation calculation unit further calculates a third amplitude function, the third amplitude function being a function that passes through an amplitude value corresponding to a first predetermined value in which the gravitational torque value in the first amplitude function takes a negative value, and an amplitude value corresponding to a second predetermined value in which the gravitational torque value in the second amplitude function takes a positive value;
wherein the torque-phase correlation calculation unit further calculates a third phase function, the third phase function being a function that passes through a phase value corresponding to a third predetermined value in which the gravitational torque value in the first phase function takes a negative value, and a phase value corresponding to a fourth predetermined value in which the gravitational torque value in the second phase function takes a positive value; and wherein, when the gravitational torque current value is smaller than the first predetermined value, the identification unit calculates the amplitude parameter corresponding to the gravitational torque current value using the first amplitude function, when the gravitational torque current value is larger than the first predetermined value and smaller than the second predetermined value, the identification unit calculates the amplitude parameter corresponding to the gravitational torque current value using the third amplitude function, when the gravitational torque current value is larger than the second predetermined value, the identification unit calculates the amplitude parameter corresponding to the gravitational torque current value using the second amplitude function, when the gravitational torque current value is smaller than the third predetermined value, the identification unit calculates the phase parameter corresponding to the gravitational torque current value using the first phase function, when the gravitational torque current value is larger than the third predetermined value and smaller than the fourth predetermined value, the identification unit calculates the phase parameter corresponding to the gravitational torque current value using the third phase function, and when the gravitational torque current value is larger than the fourth predetermined value, the identification unit calculates the phase parameter corresponding to the gravitational torque current value using the second phase function.

6. The angular transmission error identification system according to claim 5,
wherein the torque-amplitude correlation calculation unit represents the third amplitude function as a linear function, and
wherein the torque-phase correlation calculation unit represents the third phase function as a linear function.

7. An angular transmission error identification method for identifying an angular transmission error of a speed reducer of a robot arm including a joint that is rotationally driven by a motor via the speed reducer,
the angular transmission error identification method comprising a minute region amplitude/phase calculation step of calculating a minute motion range amplitude which is an amplitude of a predetermined frequency component of the angular transmission error of the speed reducer of a minute motion range and a minute motion range phase which is a phase thereof for each of a plurality of minute motion ranges arranged in a turning direction of the joint included in the motion range of the joint;
a minute region gravitational torque value calculation step of calculating a corresponding gravitational torque value which is a gravitational torque value acting on the joint in the corresponding minute motion range for each of the plurality of minute motion ranges;
a torque-amplitude correlation calculation step of calculating the first amplitude function and the second amplitude function representing a correlation between the minute motion range amplitude and the corresponding gravitational torque value, the first amplitude function being a function calculated based on the minute motion range amplitude and the corresponding gravitational torque value in the minute motion range in which the corresponding gravitational torque value takes a negative value among the plurality of minute motion ranges calculated in the minute region amplitude/phase calculation step, the second amplitude function being a function calculated based on the minute motion range amplitude and the corresponding gravitational torque value in the minute motion range in which the corresponding gravitational torque value takes a positive value among the plurality of minute motion ranges calculated in the minute region amplitude/phase calculation step;

a torque-phase correlation calculation step of calculating the first phase function and the second phase function representing the correlation between the minute motion range phase and the corresponding gravitational torque value, the first phase function being a function calculated based on the minute motion range phase and the corresponding gravitational torque value in the minute motion range in which the corresponding gravitational torque value takes a negative value among phases of the plurality of minute motion ranges calculated in the minute region amplitude/phase calculation step, the second phase function being a function calculated based on the minute motion range phase and the corresponding gravitational torque value in the minute motion range in which the corresponding gravitational torque value takes a positive value among the phase of the plurality of minute motion ranges calculated in the minute region amplitude/phase calculation step; and an identification step of calculating an amplitude parameter and a phase parameter of an angular transmission error identification function that models an angular transmission error of the speed reducer and has the amplitude parameter and the phase parameter, and identifying the angular transmission error using the angular transmission error identification function, in which, when a gravitational torque current value, which is a gravitational torque value acting on the joint when the angular transmission error of the speed reducer is identified, is included in a predetermined numerical range which is a negative numerical range, the identification step calculates the amplitude parameter corresponding to the gravitational torque current value using the first amplitude function, when the gravitational torque current value is included in the predetermined numerical range which is the negative numerical range, the identification step calculates the phase parameter corresponding to the gravitational torque current value using the first phase function, when the gravitational torque current value is included in a predetermined numerical range which is a positive numerical range, the identification step calculates the amplitude parameter corresponding to the gravitational torque current value using the second amplitude function, and when the gravitational torque current value is included in the predetermined numerical range which is the positive numerical range, the identification step calculates the phase parameter corresponding to the gravitational torque current value using the second phase function.

8. A robot system comprising an angular transmission error identification system that identifies an angular transmission error of a speed reducer of a robot arm including a joint that is rotationally driven by a motor via the speed reducer, the angular transmission error identification system comprising an identification unit that calculates an amplitude parameter and a phase parameter of an angular transmission error identification function, which is a periodic function that models an angular transmission error of the speed reducer and has the amplitude parameter and the phase parameter, and identifies the angular transmission error using the angular transmission error identification function, wherein, when a gravitational torque current value, which is a gravitational torque value acting on the joint when the angular transmission error of the speed reducer is identified, is included in a predetermined numerical range which is a negative numerical range, the identification unit calculates the amplitude parameter corresponding to the gravitational torque current value using a first amplitude function that represents a correlation between the amplitude parameter and the gravitational torque value acting on the joint in a motion range in which the gravitational torque value acting on the joint takes a negative value in a motion range of the joint, when the gravitational torque current value is included in the predetermined numerical range which is the negative numerical range, the identification unit calculates the phase parameter corresponding to the gravitational torque current value using a first phase function that represents the correlation between the phase parameter and the gravitational torque value acting on the joint in the motion range in which the gravitational torque value acting on the joint takes a negative value in the motion range of the joint, when the gravitational torque current value is included in a predetermined numerical range which is a positive numerical range, the identification unit calculates the amplitude parameter corresponding to the gravitational torque current value using a second amplitude function that represents a correlation between the amplitude parameter and the gravitational torque value acting on the joint in a motion range in which the gravitational torque value acting on the joint takes a positive value in the motion range of the joint, and when the gravitational torque current value is included in the predetermined numerical range which is the positive numerical range, the identification unit calculates the phase parameter corresponding to the gravitational torque current value using a second phase function that represents the correlation between the phase parameter and the gravitational torque value acting on the joint in the motion range in which the gravitational torque value acting on the joint takes a positive value in the motion range of the joint.

* * * * *